(12) United States Patent
Maetaki

(10) Patent No.: US 7,762,754 B2
(45) Date of Patent: Jul. 27, 2010

(54) STORAGE APPARATUS FOR TRANSPORTED OBJECT

(75) Inventor: Susumu Maetaki, Ise (JP)

(73) Assignee: Muratec Automation Co., Ltd., Kyoto-Shi (JP)

( * ) Notice: Subject to any disclaimer, the term of this patent is extended or adjusted under 35 U.S.C. 154(b) by 50 days.

(21) Appl. No.: 11/964,070

(22) Filed: Dec. 26, 2007

(65) Prior Publication Data

US 2008/0156760 A1   Jul. 3, 2008

(30) Foreign Application Priority Data

Dec. 28, 2006   (JP) ............................. 2006-356079

(51) Int. Cl.
*B65H 1/00*   (2006.01)

(52) U.S. Cl. .................... 414/281; 212/331; 414/940

(58) Field of Classification Search ................. 414/940, 414/281; 212/331
See application file for complete search history.

(56) References Cited

U.S. PATENT DOCUMENTS

| | | | | |
|---|---|---|---|---|
| 49,386 A | * | 8/1865 | Cross ......................... | 403/340 |
| 1,975,244 A | * | 10/1934 | Wiseman .................... | 439/287 |
| 3,779,658 A | * | 12/1973 | Caperton .................... | 403/393 |
| 3,873,223 A | * | 3/1975 | Caperton .................... | 403/341 |
| 3,999,630 A | * | 12/1976 | McPhee ....................... | 186/40 |
| 4,098,407 A | * | 7/1978 | Moore ......................... | 209/517 |
| 5,011,239 A | * | 4/1991 | Guerin ........................ | 312/248 |
| 5,615,994 A | * | 4/1997 | Gasser ...................... | 414/794.2 |
| 6,183,184 B1 | * | 2/2001 | Shiwaku ...................... | 414/281 |
| 6,942,111 B2 | * | 9/2005 | Harrell ........................ | 211/113 |
| 7,080,727 B1 | * | 7/2006 | Sanderson ................... | 198/680 |
| 2003/0206789 A1 | * | 11/2003 | Tai et al. ..................... | 414/275 |

FOREIGN PATENT DOCUMENTS

JP   10-109887   4/1998
JP   2006-069687   3/2006

* cited by examiner

*Primary Examiner*—Thomas J. Brahan
(74) *Attorney, Agent, or Firm*—Young & Thompson

(57) ABSTRACT

A storage apparatus (1) stores a transported object (220) from a transporting carriage (110), which travels along a track (120) installed on or near a ceiling (210) while gripping the transported object. The storage apparatus is provided with a rack portion (30), on which the transported object is put; and a support member (10), whose upper end is supported by the track or ceiling and whose lower end supports the rack portion. The support member selectively has one of first and second shapes. The first shape allows the transporting carriage to put the transported object onto the rack portion at the predetermined position. The second shape allows the rack portion to move away from a position below the track.

7 Claims, 6 Drawing Sheets

STORAGE APPARATUS FOR TRANSPORTED OBJECT

BACKGROUND OF THE INVENTION

1. Field of the Invention

The present invention relates to a storage apparatus for storing a transported object from a transporting carriages, which travels along a track. The track is installed on or near the ceiling in a factory or the like. Here, the "transported object" means a product, an intermediate product, a part, an articles, a work, a partly-finished good, a good or the like, or means a box or container for containing such a product or the like, which has been transported or is to be transported by the apparatus.

2. Description of the Related Art

In a manufacturing facility for the semiconductor device for example, a transporting system may be utilized in which a transporting carriage such as an OHT (Overhead Hoist Transport) or the like transports the transported object such as a FOUP (Front—Opening Unified Pod) or the like. The OHT travels along the track installed on or near the ceiling. The FOUP accommodates semiconductor wafers therein.

Accompanying the transporting system, a storage apparatus such as a storage rack disclosed in Japanese Patent Application Publication Laid Open No. Hei 10-109887 may be utilized, as an apparatus on which the transporting carriage temporarily puts the transported object. In this disclosure, the storage rack has a horizontal rack, which is suspended just under the track, and on which the transported object is put.

Here, there may be such a case that, while the putting position (i.e., the position to which the transported object is to be put) as for the horizontal direction or directions is positionally-adjusted, the transported object is put on the storage apparatus. For example, if the transported object is FOUP, the pins for positioning, which define the putting position as for the horizontal directions, are fixed on the rack. The pins for positioning correspond to the holes for positioning. The holes for positioning are formed on a bottom surface of the FOUP. In case of storing the FOUP on the rack, the FOUP is put on the rack such that the pins for positioning are engaged with the holes for positioning.

In this manner, in case that the putting position of the transported object as for the horizontal directions is defined, it is necessary to perform a "teaching operation", which stores or memorizes the horizontal position on the rack into the transporting system, in advance. Namely, when the rack is installed under the track, the operator initiates the mode for the teaching operation and controls the transporting system to (i) move the transported object above the rack and (ii) put the transported object onto the rack while performing such an adjustment that the transported object is positioned at a predetermined horizontal position. By this, for example, the FOUP is put on the rack in such a condition that the pins for positioning on the rack and the holes for positioning on the bottom surface of the FOUP are engaged with each other. Then, the operator controls the transporting system to store or memorize the horizontal position or the adjustment amount of the horizontal position.

Such a teaching operation is disclosed in Japanese Patent Application Publication Laid Open No. 2006-69687, for example.

On the other hand, there may be a case that it is necessary to remove the storage apparatus, in order to move the rack away from the space below the track, in case of the maintenance of the transporting carriage, the installation of a facility to the floor where the transporting system has been already installed, and so on. Then, when the once-removed storage apparatus is re-installed, the setting position after the re-installation may be slightly shifted from the original setting position before the removal. In such a case, it becomes necessary to perform the teaching operation again after the re-installation. This results in that the operation load for the removing and re-installing operations accompanied by the teaching operation becomes quite high. Further, if it is necessary to remove the whole or most parts of the storage apparatus, the operation load for the removing and re-installing operations themselves becomes quite high.

SUMMARY OF THE INVENTION

It is therefore an object of the present invention to provide a storage apparatus for storing a transported object, which allows the operation until the re-installation to be performed relatively easily, while the teaching operation after the re-installation is not required even if the rack is temporarily moved or set back.

The above object of the present invention can be achieved by a storage apparatus for storing a transported object from a transporting carriage, which travels along a track installed on or near a ceiling while gripping the transported object, provided with: a rack portion, on which the transported object is put from said transporting carriage at a predetermined position as for a horizontal direction; and a support member, whose upper end is supported by the track or ceiling and whose lower end supports said rack portion, said support member selectively having one of first and second shapes in such a condition that the upper end is supported by the track or ceiling, said first shape allowing said transporting carriage to put the transported object onto said rack portion at the predetermined position, said second shape allowing said rack portion to move away from a position below said track.

According to the storage apparatus of the present invention, it is possible to move (e.g., move back, set back or evacuate) the rack portion away from a position below the track by deforming the shape of the support member into the second shape, at the occasion of the maintenance of the transporting carriage or the like. The upper end of the support member may be directly or indirectly supported by the track, and/or directly or indirectly supported by the ceiling. The deformation is performed in such a condition that the upper end of the support member is kept to be supported by the track or ceiling. When the operation such as the maintenance or the like is completed, by returning the shape of the support member into the first shape i.e, the original shape before the deformation, the rack portion can be recovered to such a position or condition that the transporting carriage can put the transported object onto the rack portion at the predetermined position as for a horizontal direction or directions. Therefore, it is not necessary to perform the teaching operation again after the recovery of the rack portion. The operation load can be diminished in comparison with the case that the teaching operation is necessary again. Further, since it is not necessary to remove the whole or most parts of the support member or the storage apparatus, the operation load can be diminished in comparison with the case that the whole or most parts of the support member or the storage apparatus is removed.

In one aspect of the present invention, said support member comprises: an upper portion, whose upper end is supported by the track or ceiling; and a lower portion, whose upper end is detachably connected with the upper portion and whose lower end supports the rack portion.

According to this aspect, since each support member has the detachably connected upper and lower portions, at the occasion of the operation such as the maintenance or the like, the lower portion can be separated together with the rack portion from the upper portion, and can be connected to the upper portion again after the operation. Therefore, it is possible to easily realize the support member which can be deformed to displace the rack portion selectively to (i) the position where the transporting carriage can put the transported object onto the rack portion at the predetermined horizontal position and (ii) the position where the rack portion is moved back from the space below the traveling region of the transporting carriage.

In this aspect, a first restricting surface facing upward may be formed on said upper portion, a second restricting surface facing downward may be formed on said lower portion, and the upper portion and the lower portion may be connected with each other as the second restricting surface abuts to the first restricting surface from above.

By constructing in this manner, as the second restricting surface of the lower portion abuts to the first restricting surface of the upper portion from above, such a structure is realized that the lower portion can be suspended or hung from the upper portions. Therefore, when the position of the rack portion is recovered to be the original one, the position of the rack portion can be recovered to be the original one.

In this case, said storage apparatus may further comprise a cover member, which covers a connection portion of the upper portion and the lower portion and whose inner surface has a third restricting surface for restricting a movement of the lower portion with respect to the upper portion as for the horizontal direction.

By constructing in this manner, the cover member covering the connection portion of the upper and lower portions restricts the upper and lower portions from being shifted to each other by virtue of the third restricting surface. Therefore, when the position of the rack portion is recovered to be the original one, the horizontal position of the rack portion can be certainly recovered to be the original one.

In the above described aspect related to the upper and lower portions, said storage apparatus may comprise a plurality of support members each of which is said support member.

By constructing in this manner, the rack portion can be supported in stable by the support members e.g., two, four, six, eight members. Each support member can be disconnected and connected at the connection portion.

In another aspect of the present invention, said storage apparatus includes two support members each of which is said support member, one of said two support members comprises: a first upper portion, whose upper end is supported by the track or ceiling; and a first lower portion, whose upper end is detachably connected with the first upper portion and whose lower end supports the rack portion, and the other of said two support members comprises: a second upper portion, whose upper end is supported by the track or ceiling at such a position that a traveling region of said transporting carriage seeing from a traveling direction thereof is sandwiched between the first upper portion and the second upper portion; and a second lower portion whose upper end is supported by the second upper portion rotatably in such a direction that the second lower portion departs from a space below the traveling region within a plane perpendicular to the traveling direction, and whose lower end supports the rack portion.

According to this aspect, the support members are respectively disposed on both sides of the track, seeing from the traveling direction. One support member is constructed such that the upper portion and the lower portion are detachably connected with each other. The other support member is constructed such that the upper portion and the lower portions can be mutually rotated or swung. Therefore, by separating one support member and rotating the lower portion of the other support member, it is possible to easily move (e.g., move back, se back or evacuate) the rack portion away from a position below the track. Also, by rotating the lower portion of the other support member in the direction opposite to the above occasion, from the condition that the rack portion has been moved or evacuated, it is possible to easily recover the rack portion to be such an original position that the transporting carriage can put the transported object onto the rack portion at the predetermined horizontal position. Further, since it is enough to separate just one of the two support members, the moving and recovering operations are easy, and that it is possible to return the rack portion after the recovery to the original position very precisely.

The above object of the present invention can be also achieved by another storage apparatus for storing a transported object from a transporting carriage, which travels along a track installed on or near a ceiling while gripping the transported object, comprising: a rack portion, on which the transported object is put; and a support member, whose upper end is supported by the track or ceiling and whose lower end supports said rack portion, at least one portion, which supports the rack portion, of said support member being selectively displaced between a first position and a second position, said first position allowing said transporting carriage to put the transported object onto said rack portions, said second position not allowing said transporting carriage to put the transported object onto said rack portion.

According to another storage apparatus of the present invention, it is possible to easily establish such a condition that the rack portion is moved away from the space below the track, by displacing the support member to the second position, at the occasion of the maintenance of the transporting carriage or the like. When the operation such as the maintenance or the like is completed, it is possible to easily establish such a condition that the rack portion is recovered to be the original position below the track by displacing the support member to the first position, so that the transporting carriage can put the transported object onto the rack portion. Therefore, the operation load can be diminished.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

First Embodiment

Figure 1:
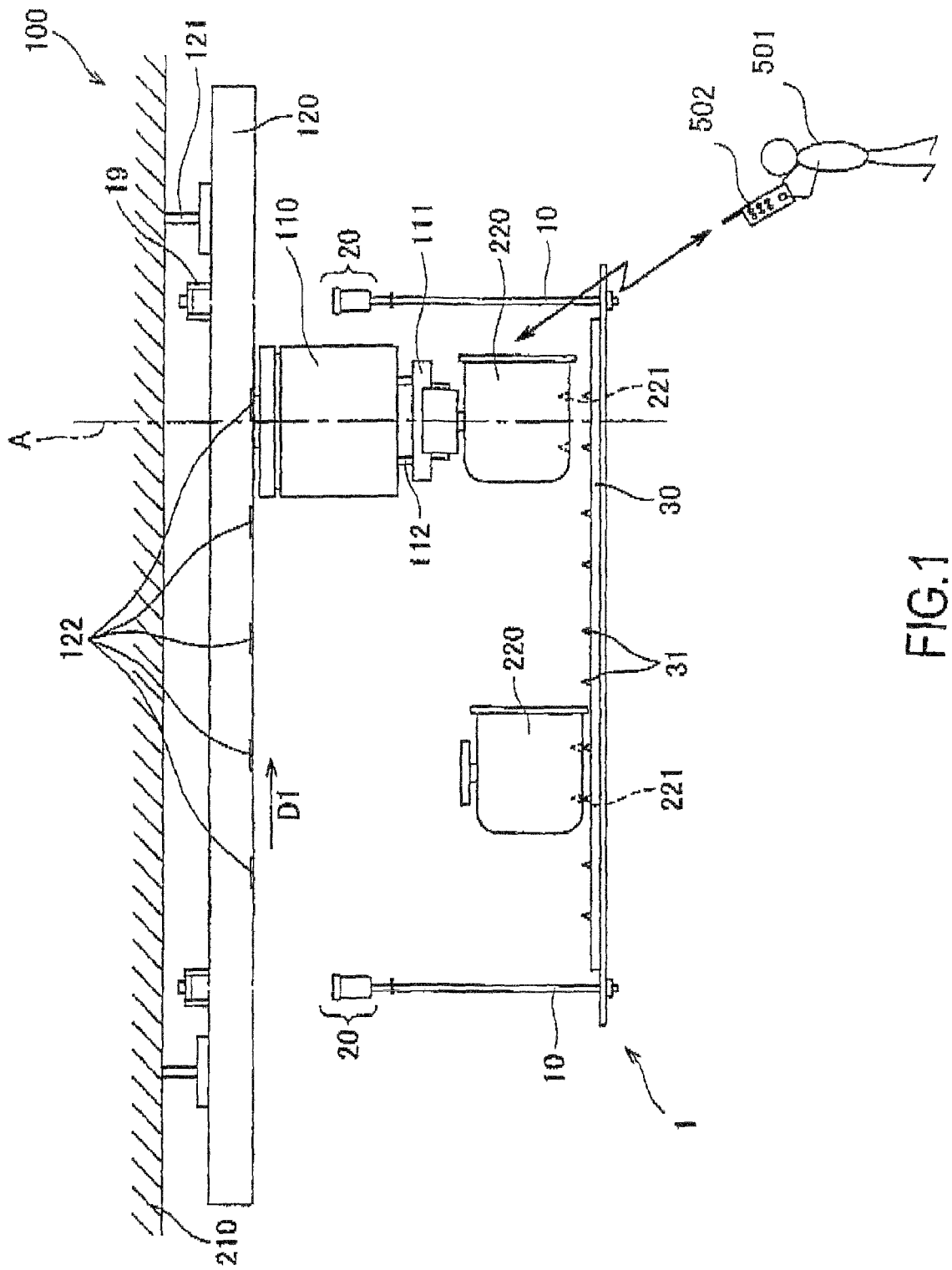
FIG. 1 is a front view of a storage apparatus as a first embodiment of the present invention.

A storage apparatus 1 as a first embodiment is explained with referring to FIG. 1 to FIG. 4. FIG. 1 shows the storage apparatus 1 used with a transporting system 100

In FIG. 1, the transporting system 100 is provided with: a track rail 120, which is suspended under a ceiling 210 through a fixing member 121; and a transporting carriage 110, which travels along a direction D1 on the track rail 120. Bar codes 122, each of which indicates a position where the transporting carriage 110 is to put a transported object, is attached to the track rail 120.

The transporting carriage 110 has a bar-code reader not-illustrated and is capable of reading the information indicated by each of the bar codes 122. The transporting carriage 110 has a gripper 111. The gripper 111 is suspended from an upper portion of the transporting carriage 110 through a hoisting (i.e., moving up and down) belt 112. The transporting carriage 110 moves up and down the gripper 111 along the vertical direction by winding up or winding out the hoisting belt 112. The transporting carriage 110 is capable of transitionally moving the gripper 111 in a horizontal direction or directions, while stopping on the track rail 120, and is capable of rotating or swinging the gripper 111 around an axis A.

The gripper 111 can grip a FOUP 220 and can release the gripped FOUP 220. The FOUP 220 is a container for containing semiconductor substrates during manufacture or the like. On the bottom surface of the FOUP 220, a plurality of positioning holes 221 are formed. The positioning holes 221 define the putting position of the FOUP 220 as for the horizontal directions.

The storage apparatus 1 is provided with a rack 30 (which is an example of the "rack portion" of the present invention) and four braces 10 (each of which is an example of the "support member" of the present invention) for supporting the rack 30 such that the upper surface of the rack 30 may be horizontally arranged. Two braces among the four braces 10 are arranged to be opposed to the other two braces through the track rail 120. In FIG. 1, only two braces 10 on one hand are illustrated. The rack 30 is fixed at the lower end of the brace 10. Each of the braces 10 has a connection cover 20 as described later. On the rack 30, a plurality of FOUPs 220 are put.

On the upper surface of the rack 30, a plurality of positioning pins 31 are arranged at each putting position of the FOUP 220 on the rack 30. At each putting position, a set of positioning pins 31 corresponding to a set of positioning holes 221 formed in one FOUP 220 are disposed. The positioning pins 31 in this one set have the mutual positional relationships as for the horizontal directions, which are the same as the mutual positional relationships of the positioning holes 221 in the one set formed in one FOUP 220. Namely, they have such mutual positional relationships that, if one FOUP 220 is put on the putting position, the positioning holes 221 formed on the one FOUP 220 are just engaged with the positioning pins 31 on the putting position.

Hereinbelow, one example of a process of installing the storage apparatus 1 to the track rail 120 is explained. First of all, the rack 30 is fixed at the lower end of each of the braces 10. Next, the upper end of each of the braces 10 is fixed to the track rail 120 through respective one of fixing members 19. Next, the bar codes 122 are attached to the track rail 122 at the upper positions of the rack 30 on the lower surface of the track rail 120. The positioning pins 31 are fixed to the vicinity of the perpendicularly downward of the respective bar codes 122 on the upper surface of the rack 30. Namely, the downward vicinity of the bar codes 122 is set as the putting position.

In ease that the storage apparatus 1 is set as described above, it is required to perform an operation for teaching the exact positional relationships as for the horizontal direction or directions between (i) the putting position indicated by the bar code 122 and (ii) the positioning pins 31, to the transporting system 100 (hereinbelow, which will be referred to as "teaching operation"). Hereinbelow, the teaching operation will be explained.

At first, the transporting carriage 110 is controlled to travel on the track rail 120 while gripping the FOUP 220, and to reach the bar code 122 indicating a predetermined putting position on the rack 30. Incidentally, the operation for moving the transporting carriage 110 to the bar code 122 is automatically controlled by the transporting system 100.

Next, an operator 501 controls the transporting system 100 by use of a remote controller 502 so that the transporting carriage 100 moves down the gripper 111. When the bottom surface of the FOUP 220 approaches the positioning pins 31 on the rack 30, the operator 501 may control the transporting carriage 110 to transitionally move (i.e., move in the horizontal direction or directions) and/or rotationally move the gripper 111 as for the horizontal directions, while the operator 501 visually watches the horizontal positions of the positioning pins 30 and the FOUP 220. By this, while visually adjusting the mutual positional relationships as for the horizontal directions between the positioning holes 221 and the positioning pins 31, the FOUP 220 is put onto the rack 30 in such a condition that the positioning holes 221 and the positioning pins 31 are engaged with each other. Then, the transporting system 100 is controlled to memorize the amount of transitionally moving the gripper 111 and the amount of rotationally moving the gripper 111, until the transporting carriage 110 puts the FOUP 220 onto the rack 30. The above explained teaching operation is performed for each rack 30 and for each putting position set on the rack 30.

On the basis of the above described teaching operations the transporting system 100 transports the FOUP 220 as below. At first, the transporting system 100 controls the transporting carriage 110 to travel to the upside of the FOUP 220, which is put on a predetermined putting position, and to move the gripper 111 down to the FOUP 220. Next, the gripper is controlled to grip the FOUP 220 and to be moved up. Next, under a condition that the gripper 111 is gripping the FOUP 220, while the transporting carriage 110 is controlled to travel on the track rail 120, the bar codes 122 on the track rail 120 are sequentially read. Then, the transporting carriage 110 is controlled to travel until the bar code 122 indicating the predetermined putting position on the rack 30 is recognized. When the transporting carriage 110 recognizes the bar code 122, the transporting carriage 110 is controlled to stop on the track rail 120. Then, the transporting carriage 110 moves down the gripper 111 until the FOUP 220 reaches the rack 30. Before the FOUP 220 reaches the rack 30, the gripper 111 is transitionally moved and/or rotationally moved by the moving amount or amounts memorized by the above described teaching operation. By this, the FOUP 220 is exactly put onto the predetermined putting position on the rack 30, where the positioning holes 221 and the positioning pins 31 are engaged with each other.

Figure 2:
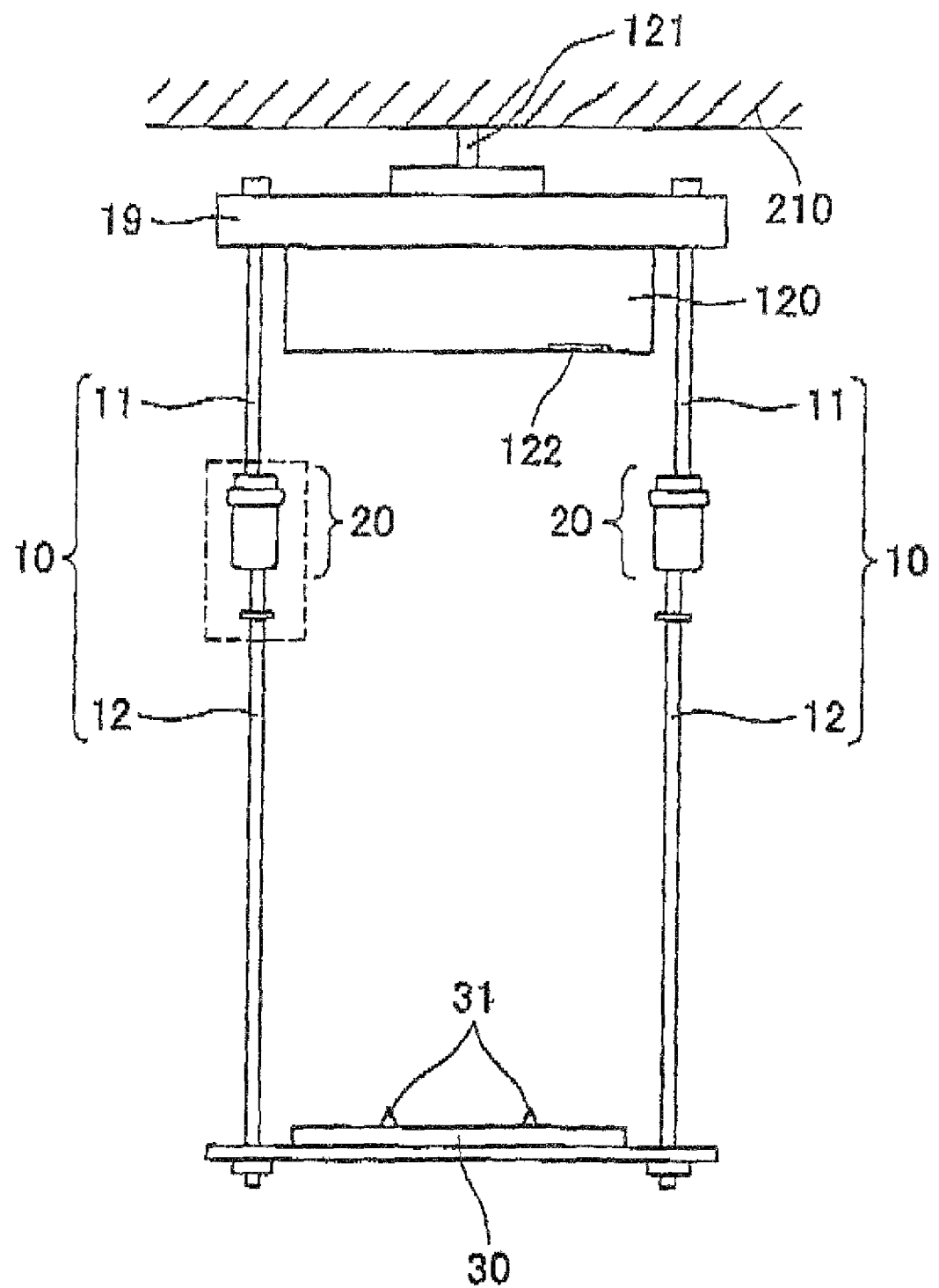
FIG. 2 is a side view of the storage apparatus of FIG. 1, seeing from a traveling direction of the transporting carriage.
Figure 3A:
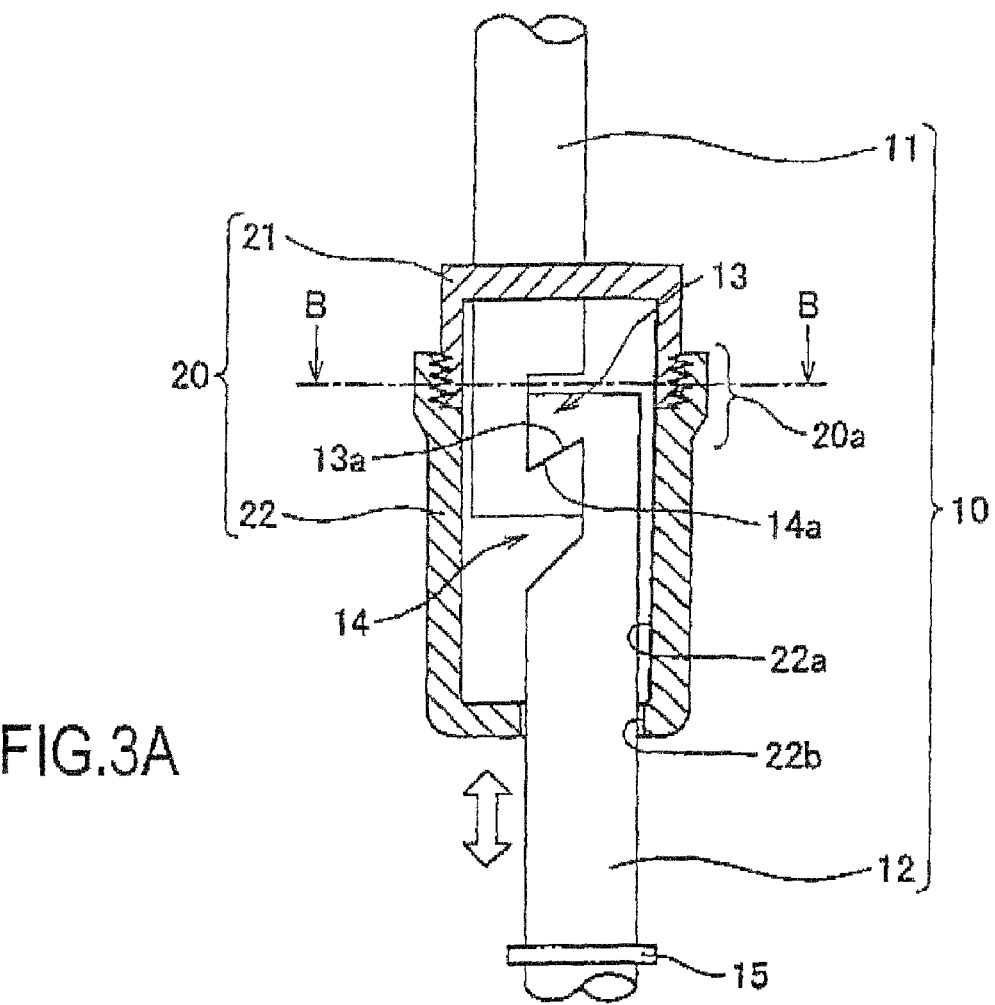
FIG. 3A is an enlarged view of a partially cross section with an internal portion of a region surrounded by a broken line in FIG. 2.
Figure 3B:
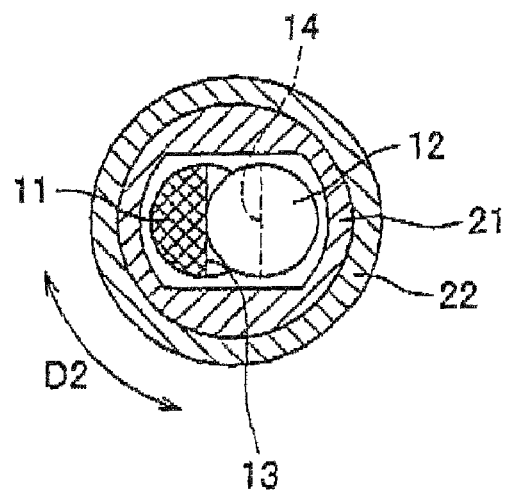
FIG. 3B is a B-B sectional view of FIG. 3A.

The storage apparatus 1 will be explained in more detail. FIG. 2 shows the storage apparatus 1 seeing from the traveling direction (i.e., the direction D1 in FIG. 1) of the transporting carriage 110 of FIG. 1. FIG. 3A is an enlarged view of a partially cross section with an internal portion of a region (i.e., connection portion of upper and lower braces 11 and 12) surrounded by a broken line in FIG. 2. FIG. 3B is a sectional view along the B-B line of FIG. 3A. The transporting carriage 110 and the FOUP 220 are omitted in FIG. 2.

In FIG. 2, each of the braces 10 has an upper brace 11 and a lower brace 12. The cross section perpendicular to the length direction of each of the upper brace 11 and the lower brace 12 has a circular shape. The upper brace 11 and the lower brace 12 are connected with each other within a connection cover 20. FIG. 3A shows the internal aspect of the connection cover 20. A groove 13 is formed in the vicinity of the lower end of the upper brace 11. A groove 14 is formed in the vicinity of the upper end of the lower brace 12. The grooves 13 and 14 are formed such that the portion upper than the groove 14 of the lower brace 12 is engaged in the groove 13, and that the portion lower than the groove 13 of the upper brace 11 is engaged in the groove 14. As the upper brace 11 and the lower brace 12 are engaged with each other at the grooves 13 and 14, the upper brace 11 and the lower brace 12 are connected with each other. At this time, a surface 13a (which is an example of the "first restricting surface" of the present invention) facing upward within the groove 13 is abut from below to a surface 14a (which is an example of the "second restricting surface" of the resent invention) facing downward within the groove 14. By this, the movement of the lower brace 12 is restricted so that the lower brace 12 is prevented from being dropped. As the structure for connecting the upper brace 11 and the lower brace 12, various structures may be employed as long as the restricting surfaces capable of restricting the movement of the lower brace 12 to be dropped are formed such as the surfaces 13a and 13b.

In FIGS. 3A and 3B, the connection cover 20 is provided with: an upper cover 21, which is fixed to the vicinity of the lower end of the upper brace 11; and a lower cover 22, which is supported by the upper cover 21. The upper cover 21 and the lower cover 22 are covers to cover the connection portion of the upper brace 11 and the lower brace 12. Each of the upper cover 21 and the lower cover 22 is a cylindrical member and is open to both of the up and down directions.

The upper cover 21 and the lower cover 22 are occlusal with each other within an occlusal area 20a. In the occlusal area 20a, screw threads are formed on each of an outer surface of the upper cover 21 and an inner surface of the lower cover 22, so that the screw threads are engaged or occlusal with each other. By rotating the lower cover 22 along a direction D2 in FIG. 3B while fixing the upper cover 21, it is possible to fix the upper cover 21 to the lower cover 22, or separate the upper cover 21 from the lower cover 22. The upper cover 21 is fixed to the upper brace 11. The lower cover 22 is not fixed to either one of the upper brace 11 and the lower brace 12. Namely, the lower cover 22 is constructed such that, when the lower cover 22 is separated from the upper cover 21, the lower cover 22 can freely move in the up and down direction in FIG. 3A in such a condition that the lower brace 12 penetrates within the lower cover 22. Further, each of inner surfaces 22a and 22b (each of which is an example of the "third restricting surface" of the present invention) of the lower cover 22 is adjusted to have such a shape and a size that the lower brace 12 is shifted as little as possible in the horizontal direction with respect to the upper brace 11 when the lower cover 22 is fixed to the upper cover 21.

Further, a reception (i.e., rest or bracket) member 15 is fixed to the lower brace 12. The reception member 15 is an projection portion, which projects from the external surface of the lower brace 12 toward the external side thereof, and extends along the circumference direction of the lower brace 12 in the cylindrical shape. The reception member 15 is constructed to be wider than the opening of the lower end of the lower cover 22. By this, the brace 10 is constructed such that, if the lower cover 22 is separated from the upper cover 21 and is dropped, it is received by the reception member 15 and is not further dropped.

By the above described structure, the upper brace 11 and the lower brace 12 are connected with each other, and the lower cover 22 is fixed to the upper cover 21. Thus, the lower brace 12 is not dropped, and the movement of the lower brace 12 is restricted so as not to be shifted in the horizontal direction with respect to the upper brace 11. Therefore, the rack 80, which is supported by the lower end of each of the lower braces 12, is not dropped, so that the horizontal position thereof can be precisely maintained.

Figure 4:
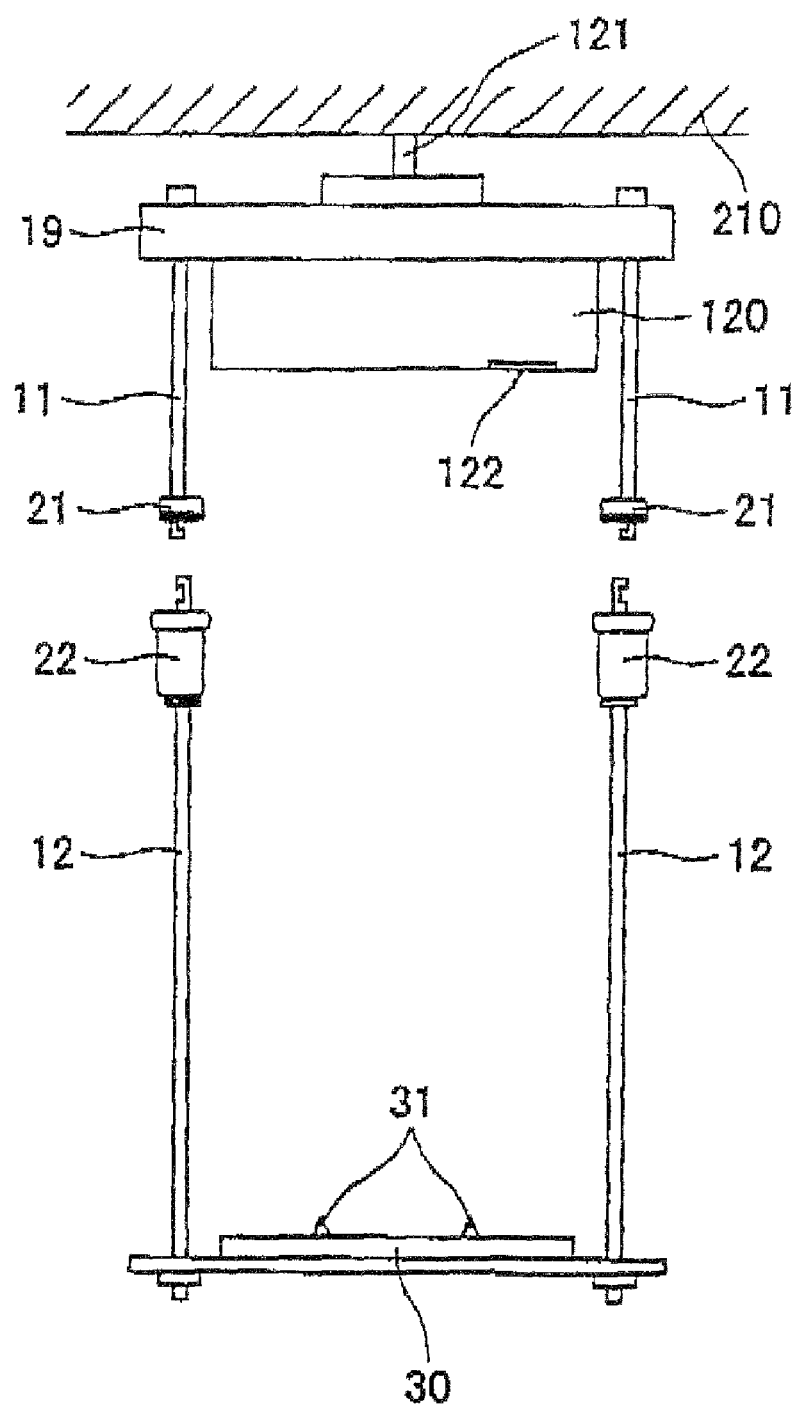
FIG. 4 is a side view of the storage apparatus of FIG. 1 in such a condition that a lower brace is separated from an upper brace.

Further, at the occasion of the maintenance of the transporting carriage 110 or the like, in case that it is required to move back or evacuate the rack 30 from the space below the traveling region of the transporting carriage 110, the lower cover 22 is separated from the upper cover 21 as illustrated in FIG. 4, and the lower brace 12 is separated from the upper brace 11. By this, it is possible to easily move back or remove the rack 30.

Furthermore, in case that the operation such as the maintenance or the like is completed, the lower brace 12 is connected again with the upper brace 11, and the lower cover 22 is fixed to the upper cover 21. By this, it is possible to re-install the rack 30 easily and it is possible after the re-installation to certainly recover the horizontal original position before moving back the rack 30, since the shift of the lower brace 12 with respect to the upper brace 11 is certainly restricted by the lower cover 22 as described above. Therefore, it is not necessary to perform the teaching operation again, and it is possible to easily perform moving back the rack 30 and recovering it.

Second Embodiment

Figure 5A:
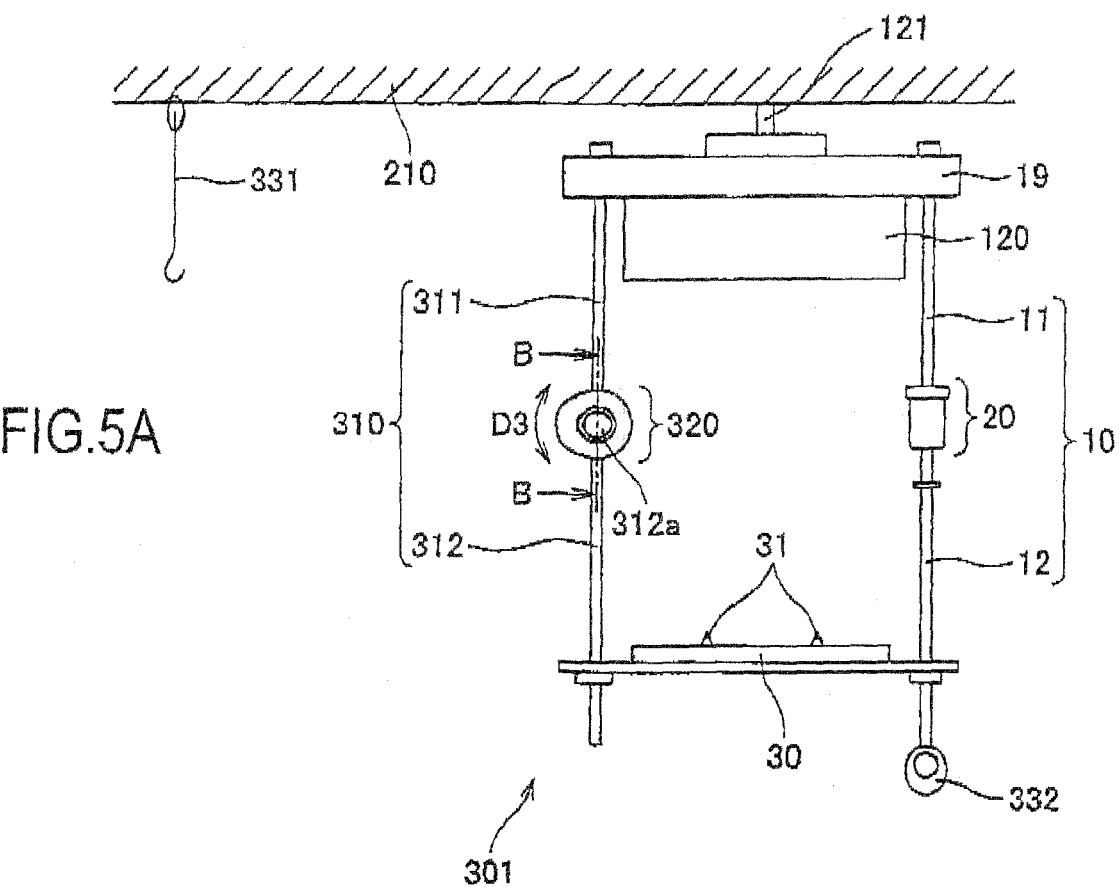
FIG. 5A is a side view of the storage apparatus as a second embodiment of the present invention.

A storage apparatus as a second embodiment is explained with referring to FIG. 5A to FIG. 6B. FIG. 5A shows a storage apparatus 301 as a second embodiment, seeing from the traveling direction of the transporting carriage 110. FIG. 5B is a sectional view of a connection portion 320 of braces 310 in FIG. 5A. In the second embodiment, the constitutional elements same as those in the first embodiment carry the same reference numerals and the explanations thereof are omitted.

In FIG. 5A, the storage apparatus 301 is provided with (i) the rack 30, to which the positioning pins 31 are fixed, and (ii) four braces for supporting the rack 30. Each of two braces 10 of those four braces has a structure same as the brace 10 in the first embodiment. Each of rest two braces 310 has a structure different from the brace 10 in the first embodiment. The two braces 10 are opposed to the rest two braces 310 through the track rail 120. FIG. 5A shows only one set of brace 10 and the brace 310, which are opposed to each other, among the four braces.

The brace 310 is provided with an upper brace 311 and a lower brace 312. The upper brace 311 and the lower brace 312 are connected with each other at the connection portion 320.

Figure 5B:
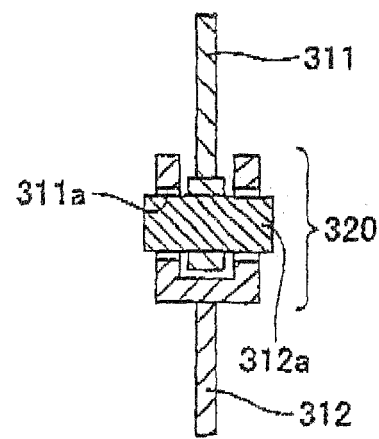
FIG. 5B is a B-B sectional view of FIG. 5A.

As illustrated by FIG. 5B, a rotation shaft 312a and a bearing is disposed in the vicinity of the lower end of the upper brace 311 while a bearing 311a for the rotation shaft 312a is disposed at the upper end of the lower brace 312. By this, the upper brace 311 and the lower brace 312 are connected or jointed with each other so that the lower brace 312 is capable of rotating or swinging in a direction D3 in FIG. 5A with respect to the rotation shaft 312a as the rotation center. Incidentally, the connection portion 320 may be constructed such that the rotation is possible in the clockwise direction from the condition shown in FIG. 5A and the rotation is restricted in the anti-clockwise direction from the condition shown in FIG. 5A.

A ring 332 is fixed under the brace 12. A hook 331 is fixed under the ceiling 210 at a position distant from the fixing member 121 in the left direction in FIG. 5A for a predetermined distance.

Figure 6A:
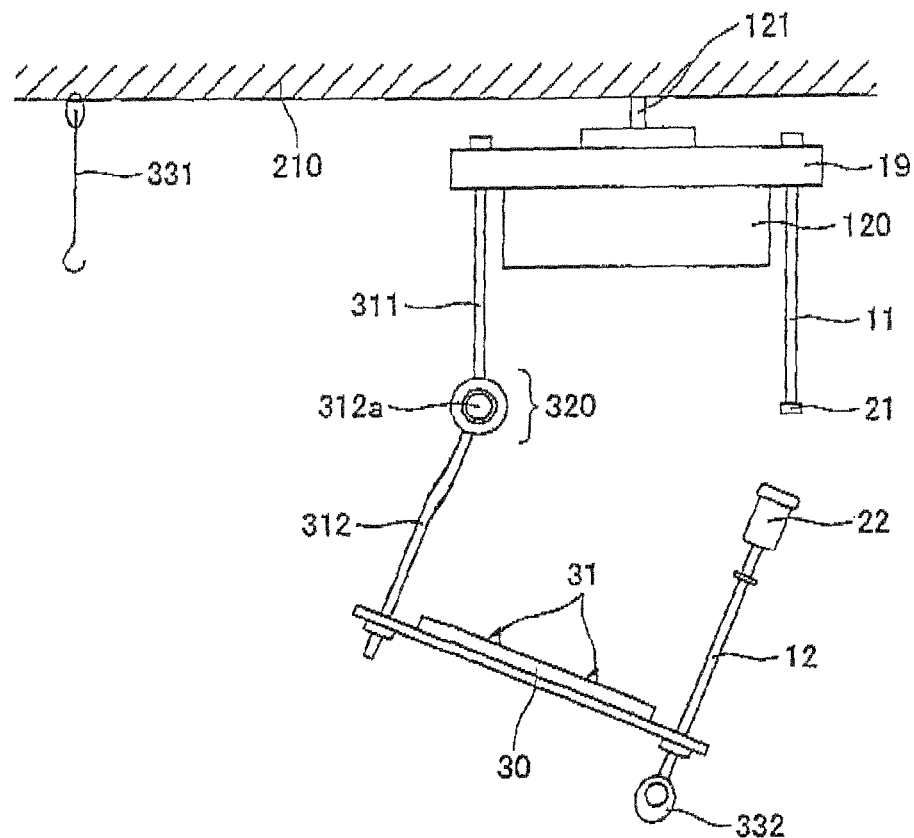
FIG. 6A is one side view of the storage apparatus showing a procedure of moving back the rack portion, in the second embodiment.
Figure 6B:
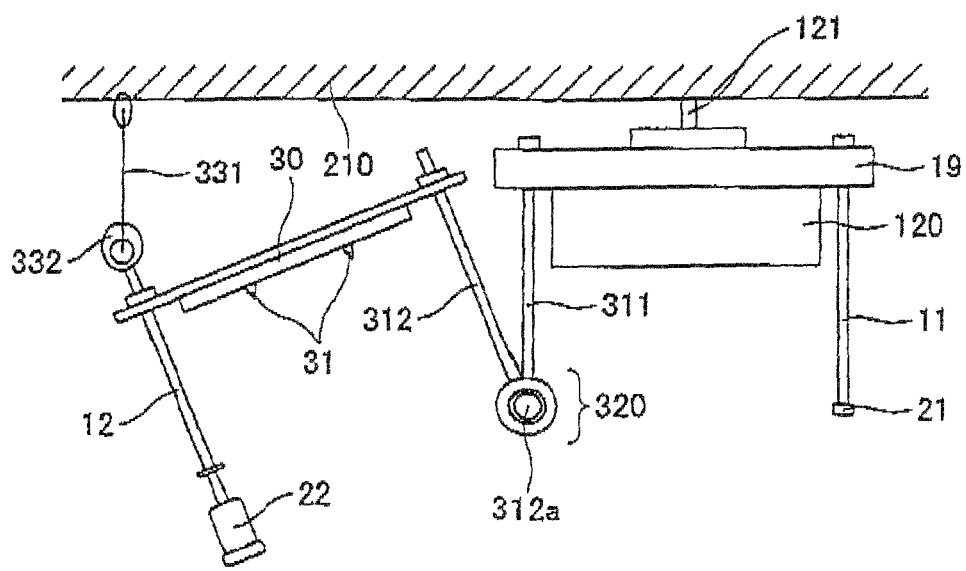
FIG. 6B is another side view of the storage apparatus showing the moving procedure in the second embodiment.

By the above described structure, in case that it is required to move back the rack 30 from the space below the traveling region of the transporting carriage 110, the braces 10 are disconnected and the braces 310 are deformed as illustrated in FIG. 6A and FIG. 6B. At first, the lower cover 22 is separated from the upper cover 21, and the lower brace 12 is separated from the upper brace 11. Next, the lower brace 312 is rotated in the clockwise direction in FIG. 6A with respect to the upper brace 311 with the rotation shaft 312a as the rotation center. When the lower brace 312 is rotated until the ring 332 approaches the ceiling 210, the ring 332 is hooked to the hook 331 as illustrated in FIG. 6B. In this way, by rotating the lower brace 312 with respect to the upper brace 311 in such a manner that the rack 30 is made distant from the space below the track rail 120 (i.e., the space below the traveling region of the transporting carriage 110), it is possible to move back the rack 30 from the space below the track rail 120. The distance between the hook 331 and the fixing member 121 is adjusted to be such a distance that the ring 332 can be just hooked to the hook 331.

Furthermore, in case that the once-moved back rack 30 is re-positioned to the space below the track rail 120, the braces 10 are connected again and 310 are deformed as following. Namely, the ring 332 is taken out from the hook 331. Next, the lower brace 312 is rotated in the anti-clockwise direction in FIG. 6B with the rotation shaft 312a as the rotation center. Next, when the lower brace 312 is rotated until the upper end of the lower brace 12 approaches the lower end of the upper brace 11, the upper end of the lower brace 12 is connected to the upper brace 11. Then, the lower cover 22 is fixed to the upper cover 21. In this way, by rotating the lower brace 312 with respect to the upper brace 311, it is possible to recover the rack 30 in the space below the track rail 120.

As described above, according to the second embodiment, by rotating the lower brace 312 with respect to the upper brace 311, it is possible to easily perform moving back the rack 30 from the space under the track rail 120 and also easily perform re-installing the rack 30 to the space below the track rail 120. Further, upon recovering the rack 30, since the shift of the lower brace 12 with respect to the upper brace 11 is certainly restricted by the lower cover 22 and since the shift of the lower brace 312 with respect to the upper brace 311 is certainly restricted by the connection portion 320 as described above, it is not necessary to perform the teaching operation again after the recover of the rack 30. Furthers since only two braces i.e., the braces 10 out of four braces are separated from each other, the operations of moving back and recovering the rack 30 are easier than those in the first embodiment.

Modified Embodiment

The above explanations are for the preferred embodiments, to which the present invention is not limited. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein. For example, in the above embodiments, the upper end of the brace 10 is fixed to the track rail 120. Instead, it may be fixed to the ceiling 210. Further, it may be directly fixed or indirectly (e.g., through a fixing member or the like) fixed to the ceiling 210 or the track rail 120.

The entire disclosure of Japanese Patent Application No. 2006-356079 filed on Dec. 28, 2006 including the specification, claims, drawings and summary is incorporated herein by reference in its entirety.

What is claimed is:

1. A storage apparatus for storing a transported object from a transporting carriage, which travels along a track installed on or near a ceiling while gripping the transported object, comprising:
    a rack portion, on which the transported object is put from said transporting carriage at a predetermined position as for a horizontal direction;
    a support member having i) an upper portion whose upper end is supported by the track or ceiling, and ii) a lower portion whose upper end is detachably connected with the upper portion and whose lower end supports the rack portion,
    said support member selectively having one of first and second shapes in such a condition that the upper end is supported by the track or ceiling, said first shape allowing said transporting carriage to put the transported object onto the predetermined position of said rack portion at the predetermined position, said second shape allowing said rack portion to move away from said predetermined position in the first shape; and
    said transported object, wherein said transported object is a Front-Open Unified Pod (FOUP) having a plurality of positioning holes on a bottom surface thereof.

2. The storage apparatus according to claim 1, wherein a plurality of positioning pins are arranged at the position corresponding to said positioning holes on the rack portion.

3. The storage apparatus according to claim 1, wherein,
    a first restricting surface facing upward is formed on said upper portion,
    a second restricting surface facing downward is formed on said lower portion, and
    the upper portion is connected to the lower portion with the second restricting surface abutting the first restricting surface from above.

4. The storage apparatus according to claim 3, further comprising a cover member which covers a connection portion of the upper portion and the lower portion and whose inner surface has a third restricting surface for restricting a movement of the lower portion with respect to the upper portion as for the horizontal direction.

5. A storage apparatus for storing a transported object from a transporting carriage, which travels along a track installed on or near a ceiling while gripping the transported object, comprising:

a rack portion, on which the transported object is put from said transporting carriage at a predetermined position as for a horizontal direction; and two support members, whose upper end is supported by the track or ceiling and whose lower end supports said rack portion, said support member selectively having one of first and second shapes in such a condition that the upper end is supported by the track or ceiling, said first shape allowing said transporting carriage to put the transported object onto the predetermined position of said rack portion at the predetermined position, said second shape allowing said rack portion to move away from said predetermined position in the first shape, one of said two support members having a first upper portion whose upper end is supported by the track or ceiling and a first lower portion whose upper end is detachably connected with the first upper portion and whose lower end supports the rack portion, and the other of said two support members having a second upper portion whose upper end is supported by the track or ceiling at such a position that there is a traveling region sandwiched between the first upper portion and the second upper portion when seen from a traveling direction of said transporting carriage, and a second lower portion whose upper end is supported by the second upper portion rotatably in such a direction that the second lower portion departs from a space below the traveling region within a plane perpendicular to the traveling direction, and whose lower end supports the rack portion.

6. The storage apparatus according to claim 5, further comprising said transported object, and wherein said transported object is a Front-Open Unified Pod (FOUP) having a plurality of positioning holes on a bottom surface thereof.

7. The storage apparatus according to claim 6, a plurality of positioning pins are arranged at the position corresponding to said positioning holes on the rack portion.

* * * * *